Figure 1:
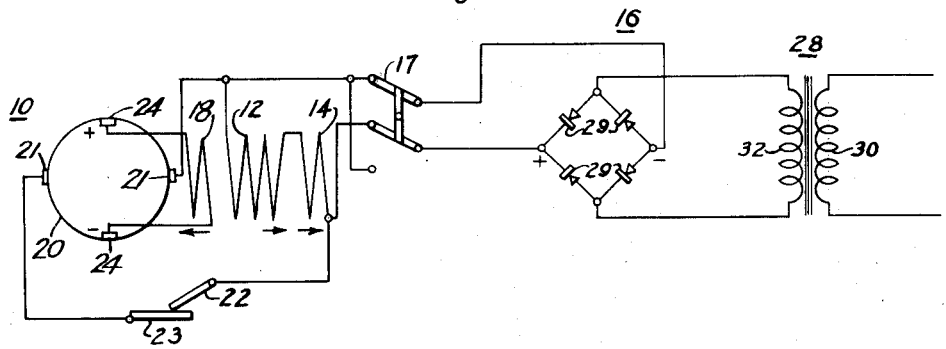

April 9, 1940.   W. R. HARDING ET AL   2,196,414
CROSS FIELD GENERATOR
Filed Dec. 30, 1937

WITNESSES:

INVENTORS.
William R. Harding and
Theodore C. Fockler.
BY
ATTORNEY

Patented Apr. 9, 1940

2,196,414

UNITED STATES PATENT OFFICE 2,196,414

CROSS FIELD GENERATOR

William R. Harding, Pittsburgh, and Theodore C. Fockler, Wilkinsburg, Pa., assignors to Westinghouse Electric & Manufacturing Company, East Pittsburgh, Pa., a corporation of Pennsylvania Application December 30, 1937, Serial No. 182,496

5 Claims. (Cl. 171—223)

Our invention refers, generally, to generators, and it has reference in particular to generators of the cross-field type, which have auxiliary excitation means for controlling the terminal polarity thereof.

In the art of electric arc welding, it has long been realized that the polarity of the welding electrode may often be a critical factor in ensuring the production of satisfactory welds. Inasmuch as generators of the cross-field type, which have recently come into wide use in the welding industry, rely mainly upon series field excitation for the production of the magnetic flux in the field pole members thereof, it may be seen that machines of this type must rely solely on the residual magnetism of the field pole members to produce the open circuit voltage. This results in such generators generally having a lower open circuit voltage than machines of other types, which employ shunt field windings to aid in the production of the main flux of the machine. Hence it is not uncommon to have the terminal polarity of a generator of the cross-field type reversed, through contact of its welding electrode with the electrode of a generator of higher open circuit voltage, whereby a circulating current is forced through the series field windings of the cross-field generator in the reverse direction, reversing the polarity of the residual magnetism of the field pole members, and hence the terminal polarity of the generator.

In order to prevent such accidental reversal of terminal polarity, various schemes have been evolved for ensuring the terminal polarity of cross-field generators. In general, these schemes have utilized a source of auxiliary excitation in connection with a field pole winding of the generator for ensuring the polarity of the residual magnetism of a field pole member and permitting the operator, by the operation of a simple span switch, to reverse the polarity of the residual magnetism of the field pole member, and thus reverse the terminal polarity of the generator. One of such schemes is disclosed in detail in a copending application, Serial No. 165,286, of J. H. Blankenbuehler, assigned to the assignee of this invention. These schemes, while effective in providing a ready method of control of the terminal polarity of the generator, have disadvantages. Since generators of the cross-field type have a normally close-circuited auxiliary brush circuit, any excitation of the field pole windings which results in an increase of the field pole flux, must necessarily increase the circulating current induced in the auxiliary brush circuit by flux. It has been found that in many instances the increase of current in the auxiliary brush armature circuit resulting from such auxiliary excitation has been so great as to cause sparking of the auxiliary brushes at no load, with a resultant increased wear of the commutator and decreased life of both main and auxiliary brushes. The stability of the machine when operating under load is likewise affected, and commutation at the main brushes is materially impaired.

It is, therefore, generally, an object of our invention to provide circuit means in connection with a generator of the cross-field type for permitting auxiliary excitation of a field pole winding without increasing the no-load current in the auxiliary brush circuit above a predetermined value.

More specifically, it is an object of our invention to provide a differential field winding for a field pole member of a generator of the cross-field type, for effecting a neutralization of the separate excitation thereof, when the desired terminal polarity of the generator is substantially determined.

Another object of our invention is to provide circuit means in connection with the armature of a generator of the cross-field type for substantially neutralizing the effects of separate excitation of a field pole winding, when the generator has reached a steady state no-load condition.

Still another object of our invention is to provide circuit means including a differential field pole winding in connection with a generator of the cross-field type for opposing the separate excitation of a field pole winding to prevent increase of the no-load armature current above a predetermined value.

A further object of our invention is to provide circuit means in connection with a field pole member of a generator of the cross-field type to effect an initial determination of the residual polarity of the field pole member without increasing the no-load value of the auxiliary brush circuit armature current above a predetermined value.

A still further object of our invention is to provide means including a differential field winding and a source of separate excitation for initially determining the terminal polarity of a generator of the cross-field type without increasing the steady state no load air gap flux thereof.

Other objects will, in part, be obvious and, in part, appear hereinafter.

Figure 2:
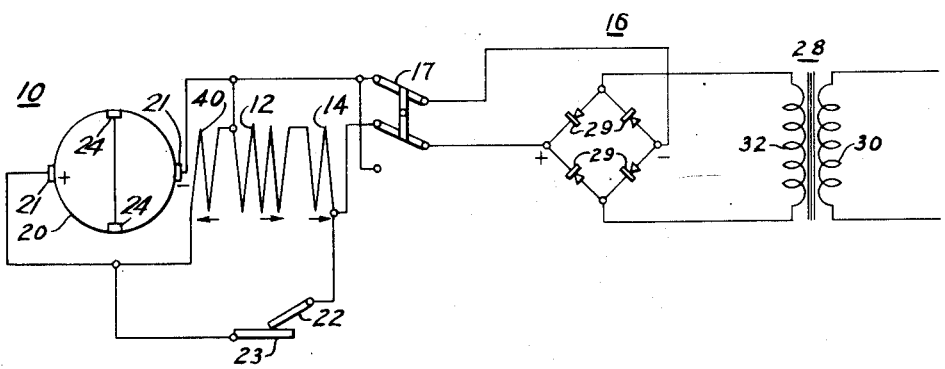

For a further understanding of the nature and scope of our invention, reference may be had to the following detailed description, taken in connection with the accompanying drawing in which:

Figure 1 illustrates diagrammatically a preferred embodiment of our invention; and, Fig. 2 illustrates diagrammatically an alternative form of our invention practiced in connection with a generator of the cross-field type.

Referring to Fig. 1, it may be seen that in practicing a preferred form of our invention, a cross-field generator 10, which is adapted for auxiliary polarity control by separate excitation of a field pole winding, such as by connection of the series field winding 12 and commutating winding 14, as shown, to an independent source of excitation 16 through a reversing switch 17, may be provided with a differential field winding 18, which is disposed to substantially neutralize the effects of the separate excitation, under steady state no-load conditions.

The armature 20 of the cross-field generator 10 may be provided with main brushes 21, which are disposed in connection with the series field winding 12, commutating winding 14, and a welding circuit, including an electrode 22 and work 23 upon which a welding operation is to be performed. Auxiliary brushes 24, which are disposed in quadrature to the main brushes, may be connected to a differential field winding 18 to provide for its energization in such a manner as to generally oppose the effects of the separate excitation of the series field winding 12 and the commutating field winding 14.

As shown, the source of auxiliary excitation 16 may comprise, a control transformer 28, having a primary winding 30 adapted for connection to an alternating current source and a secondary winding 32 connected through a rectifying device, which may comprise a well known bridge circuit of unilateral current devices 29 and reversing switch 17 to the series field winding 12 and commutating winding 14. By connecting the primary winding 30 of the control transformer 28 to an external source of alternating current, such, for example, as across the terminal connections of the driving motor (not shown) of the generator 10, it may be seen that as soon as the driving motor of the generator is energized, the field windings 12 and 14 of the generator will be separately excited, thus determining the polarity of the residual magnetism in the field pole member, and hence initially determining the terminal polarity of the generator. Moreover, by operation of the reversing switch 17 the direction of flow of this excitation current may be controlled, and the terminal polarity of the generator readily reversed.

However, as soon as generator has built up to the correct polarity, continuance of the auxiliary excitation of the field winding is no longer necessary and if maintained, will result in a marked increase of armature circulating current in the auxiliary brush circuit. With our present invention it will be seen that this auxiliary excitation will now be opposed by the magneto-motive force of the differential field winding 18, which may be connected across the auxiliary brushes 24 of the armature 20. By so designing the differential winding 18 that its magnetomotive force effectively neutralizes the effects of the auxiliary excitation of the series field winding from the source 16 when the current in the auxiliary brush circuit reaches a desirable value, any undue increase in the auxiliary brush current may be prevented. The auxiliary excitation of the field windings may thus initially determine the polarity of the residual magnetism of the field pole members and permit ready reversal thereof at the operator's will, and ensure the generator building up to the correct terminal polarity; and yet such auxiliary excitation may be sufficiently neutralized by the effects of the differential winding 18, when a steady state condition is reached, to prevent any undue increase in the no-load auxiliary brush circuit armature current and avoid the harmful effects resulting therefrom.

Referring to Fig. 2, which discloses an alternative form of our invention in connection with a generator of the cross-field type, it may be seen that we have provided differential shunt field winding 40 in connection with the main brushes 21 of the generator 10, to oppose the effects of the auxiliary excitation of the series field winding 12 and the commutating field winding 14. By so designing the differential shunt field winding 40 that its magnetomotive force will substantially balance the magnetomotive force produced by the auxiliary excitation of the series field winding 12 and a commutating field winding 14, when the terminal voltage across the main brushes 21 has reached a predetermined desirable value, it may be seen that the auxiliary excitation of a series field winding is effective to determine the residual polarity of the field pole members, and yet is prevented from unduly increasing the circulating current between the close-circuited auxiliary brushes 24 of the armature 20.

It may thus be seen that by our invention we have provided circuit means in connection with the armature of a generator of the cross-field type having auxiliary field pole excitation, for permitting such auxiliary excitation to ensure the correct terminal polarity of the generator, yet preventing any undue increase in the no-load armature current of the generator through such auxiliary excitation.

Since certain changes may be made in the above construction, and different embodiments of the invention may be made without departing from the spirit thereof, it is intended all the matter contained in the above description, or shown in the accompanying drawing, will be considered as illustrative, and not in a limiting sense.

We claim as our invention:

1. In a generator of the cross-field type the combination, of an armature having main and auxiliary brushes, a plurality of field pole members, a plurality of excitation windings additively associated with the field pole members for producing magnetic flux therein, circuit means for controlling the terminal polarity of the generator by selectively connecting one of said windings to an independent source of excitation, and a differential field pole winding connected to the auxiliary brushes for neutralizing the tendency of the independent excitation to increase the no-load armature cross field excitation current in the auxiliary brush circuit.

2. In a generator of the cross-field type the combination, of an armature having main and auxiliary brushes, a plurality of field pole members, field pole windings disposed in series circuit relation with the main brushes, and circuit means connecting said windings to a separate source of excitation, an additional field pole winding disposed in connection with the auxiliary brushes for opposing the no-load magnetomotive force of the separate excitation.

3. The combination in a generator of the cross-field type, of an armature having main and auxiliary brushes, a pair of field pole members having main field windings, circuit means including a separate source of auxiliary excitation connected to at least one of said windings, and means including a differential field winding on one of the field pole members connected in series circuit relation with the auxiliary brushes.

4. The combination in a generator of the cross-field type, of an armature having main and auxiliary brushes, a pair of opposed field pole members having main field windings, means including an auxiliary source of excitation disposed to be reversibly connected to at least one of said field windings to selectively determine the polarity of the residual magnetism of the field pole members, and an auxiliary field pole winding so connected between the auxiliary brushes as to provide an armature excitation circuit for producing a cross-field flux and oppose the magnetomotive force produced by the auxiliary excitation on the main field windings.

5. A generator of the cross-field type comprising, an armature having main and auxiliary brushes, a pair of oppositely disposed field pole members having main field windings connected in series circuit relation with the main brushes, means including a separate source of excitation and a switch for reversibly connecting the source to at least one of the main field windings to selectively determine the residual polarity of a field pole member, and a differential field winding having a common axis with the main field windings connected to the auxiliary brushes to provide an armature circuit for a cross field excitation current and oppose the magnetomotive force of the main field windings to the extent of the auxiliary excitation.

WILLIAM R. HARDING.
THEODORE C. FOCKLER.